(12) United States Patent
Dombrock et al.

(10) Patent No.: US 11,691,905 B2
(45) Date of Patent: Jul. 4, 2023

(54) LIQUID AERATOR AND AIR COMPRESSOR THEREOF

(71) Applicant: Kasco Marine, Inc., Prescott, WI (US)

(72) Inventors: Todd Dombrock, Prescott, WI (US); Ian Watters, Prescott, WI (US); James Verdouw, Prescott, WI (US); Trevor Johnson, Prescott, WI (US)

(73) Assignee: Kasco Marine, Inc., Prescott, WI (US)

( * ) Notice: Subject to any disclaimer, the term of this patent is extended or adjusted under 35 U.S.C. 154(b) by 97 days.

(21) Appl. No.: 17/245,119

(22) Filed: Apr. 30, 2021

(65) Prior Publication Data

US 2021/0340043 A1 Nov. 4, 2021

Related U.S. Application Data

(60) Provisional application No. 63/018,723, filed on May 1, 2020.

(51) Int. Cl.
| | | |
|---|---|---|
| *B01F 3/04* | (2006.01) | |
| *C02F 7/00* | (2006.01) | |
| *F04B 39/16* | (2006.01) | |
| *B01F 23/231* | (2022.01) | |
| *B01F 101/00* | (2022.01) | |

(52) U.S. Cl.
CPC ............ *C02F 7/00* (2013.01); *B01F 23/2312* (2022.01); *F04B 39/16* (2013.01); *B01F 23/231265* (2022.01); *B01F 2101/305* (2022.01)

(58) Field of Classification Search
CPC .............................. C02F 7/00; B01F 23/2312; B01F 23/231265; B01F 2101/305; F04B 39/16
USPC .................................................. 261/30, 122.1
See application file for complete search history.

(56) References Cited

U.S. PATENT DOCUMENTS

| | | | | | |
|---|---|---|---|---|---|
| 4,906,359 | A | * | 3/1990 | Cox, Jr. ................... | F24S 20/70 261/120 |
| 5,681,509 | A | * | 10/1997 | Bailey .................... | B01F 35/213 261/87 |
| 6,676,837 | B2 | * | 1/2004 | Keeton, Jr. .......... | B01F 35/2132 210/220 |
| 7,048,861 | B2 | * | 5/2006 | Beretta, III ............... | C02F 1/74 210/170.07 |
| 9,181,105 | B2 | * | 11/2015 | Kania ...................... | C02F 3/327 |
| 9,290,398 | B2 | * | 3/2016 | Burton ...................... | C02F 7/00 |
| 9,789,447 | B1 | | 10/2017 | Cordes | |
| 10,514,029 | B2 | * | 12/2019 | Suarez .................... | F04B 39/10 |
| 11,117,106 | B2 | * | 9/2021 | Li .............................. | C02F 1/74 |
| 2005/0133456 | A1 | * | 6/2005 | Beretta, III ............... | C02F 1/74 210/138 |
| 2010/0039061 | A1 | * | 2/2010 | Rosenbaum ............ | E02B 1/003 320/101 |

\* cited by examiner

*Primary Examiner* — Charles S Bushey
(74) *Attorney, Agent, or Firm* — Hamre, Schumann, Mueller & Larson, P.C.

(57) ABSTRACT

A liquid aeration system includes an air compressor system and a diffuser. The air compressor system includes an air intake manifold, an air compressor, and a compressor inlet line. The compressor inlet line fluidly connects the air intake manifold and the suction inlet of the air compressor. The compressor suctions air from the air intake manifold through at least the suction inlet hose. The compressor compresses the air into compressed air that is supplied to the diffuser.

20 Claims, 7 Drawing Sheets

LIQUID AERATOR AND AIR COMPRESSOR THEREOF

FIELD

This disclosure relates to liquid aerators for bodies of water. More specifically, this disclosure relates to air compression systems in such liquid aerators.

BACKGROUND

Liquid aerators can aerate bodies of water by dispersing air into the water in the form of air bubbles. The air bubbles then rise through the water until reaching the surface. As the bubbles travel to the surface, they bring the water with them, creating an upward flow to the surface of the water. This moves the deeper water up to the surface, where it is exposed to the air and allows aeration to occur. The upward movement of the air bubbles also pushes warmer water upwards which can prevent ice from forming on the surface of the water. For example, this aeration can be used in bodies of water to protect docks, boats, etc. from ice damage. For example, this aeration can thermally and chemically de-stratify the body of water during the summer. Liquid aerators may include an air compressor that compresses air that is used to form the air bubbles.

SUMMARY

In an embodiment, a liquid aerator system includes an air compressor system and a diffuser. Compressed air is supplied from the air compressor system to the diffuser. The diffuser disperses the compressed air.

In some embodiments, the liquid aerator system can be used to aerate a body of water to prevent the water from freezing. The body of water can be any body of water that one may wish to use a liquid aerator system in including, but not limited to, a body of fresh water, brackish water, salt water, potable water, and/or chemically treated water.

In an embodiment, the air compressor system includes an air intake manifold, an air compressor, and a compressor inlet line. The compressor inlet line fluidly connects the suction inlet of the air compressor and the air intake manifold. Air from the air intake manifold is suctioned into the suction inlet of the compressor through at least the compressor inlet line.

In an embodiment, the compressor and the air intake manifold are separately mounted whereby the air intake manifold is not directly attached to the compressor. The compressor inlet line increases a length of the flow path of the air from the air intake manifold to the suction inlet of the compressor.

In an embodiment, the air compressor includes an air filter. Air flows into the suction inlet of the air compressor by passing through at least the air filter, the intake manifold, and the compressor inlet line. In an embodiment, the air filter is directly attached to the intake manifold. In another embodiment, the air filter is fluidly connected to the intake manifold by a hose.

In an embodiment, the liquid aerator system includes an air supply line that fluidly connects the air compressor to the diffuser. The compressed air discharged from the air compressor flows from the air compressor to the diffuser through the air supply line.

In an embodiment, the liquid aerator system can include multiple diffusers. The air compressor supplies compressed air to two or more diffusers. In another embodiment, the liquid aerator system can include multiple diffusers and the air compressor system can include multiple air compressors. A first compressor can supply compressed air to a first diffuser and a second compressor can supply compressed air to a second diffuser.

DRAWINGS

Like reference characters refer to similar features.

DETAILED DESCRIPTION

Figure 1:
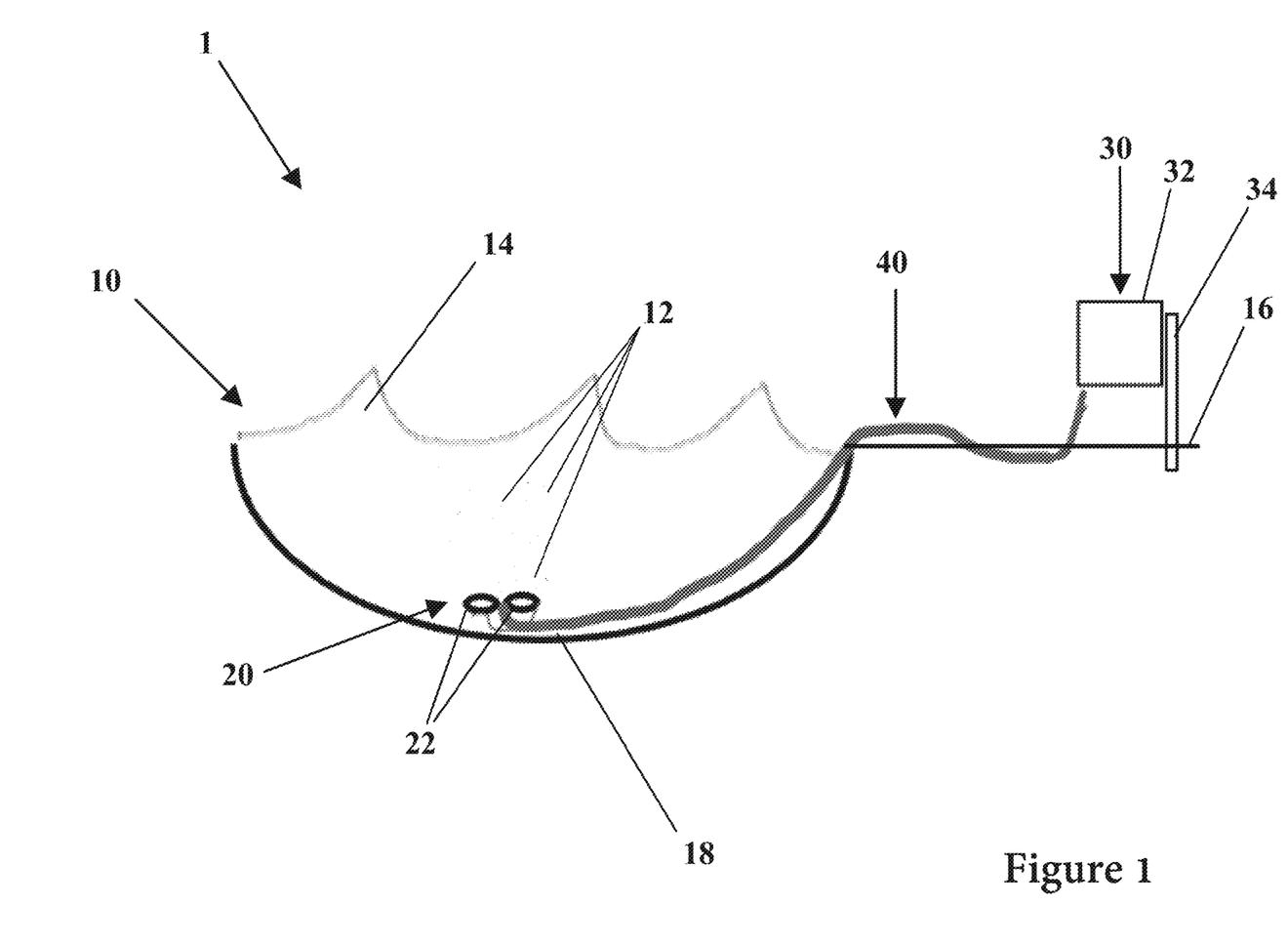
FIG. 1 is a schematic of one embodiment of a liquid aeration system including a liquid aerator in a body of liquid and an air compressor system.

FIG. 1 is a schematic of an embodiment of a liquid aeration system 1 for aerating a body of water 10. The liquid aeration system 1 forms air bubbles 12 in the water 14 that raise through the water 14 and aerates the body of water 10. The upward movement of the air bubbles 12 also causes water to flow upward to prevent freezing of the water within the vicinity of the aeration system 1.

The body of water 10 can be any body of water, natural or man-made, that one may wish to aerate and prevent freezing of the water including, but not limited to, a pond, a lake, a river, and the like. The water in the body of water may be fresh water, salt water, potable water, brackish water, chemically treated water, or any other type of water that is subject to freezing. For sake of convenience, the liquid aeration system 1 is described below as aerating water 14 in a body of water 10. In other embodiments, the liquid aeration system 1 can be configured to aerate bodies of liquid other than water.

The liquid aeration system 1 includes a diffuser 20 and an air compressor system 30. The air compressor system 30 suctions air from its general environment and compresses the air into compressed air for the diffuser 20. The air compressor system 30 is located outside of but near the body of water 10. For example, the air compressor system 30 in FIG. 1 is located on the shore of the body of the water 10. The air compressor system 30 can include an enclosure 32 for its components (e.g., air compressor, air filter, intake manifold, etc.). in this embodiment, the enclosure 32 can be mounted to a post 34 such that the enclosure 32 and the components within are elevated above the ground 16. In other embodiments, the air compressor system 30 and/or the enclosure 32 may be configured to sit on the ground 16 or on a pad, such as a concrete or composite pad, on the ground 16.

An air supply line 40 extends from the air compressor system 30 to the diffuser 20 and fluidly connects the air compressor system 30 and the diffuser 20. The air supply line 40 supplies compressed air produced by the air compressor system 30 to the diffuser 20. Compressed air flows from the air compressor 30 to the diffuser 20 via the air supply line 40 and is distributed into the water 10 by the diffuser 20. As shown in the example, the air supply line 40 can have portions that extend underground, aboveground, and through the water 14.

The diffuser 20 is located in the water 14. For example, the diffuser 20 can be configured to sit on the bottom 18 of the body of water 10. The compressed air flows from the air compression system 30 to the diffuser 20 and the diffuser 20 releases air bubbles 12 in the water 14. For example, the compressed air flows through one or more porous surface(s) 22 of the diffuser 20 and is distributed into the water 14 in the form of the air bubbles 12. The air bubbles 12 aerate the water 14. The upward motion of the air bubbles 12 also causes upward water movement and flow in the water 14.

Figure 2:
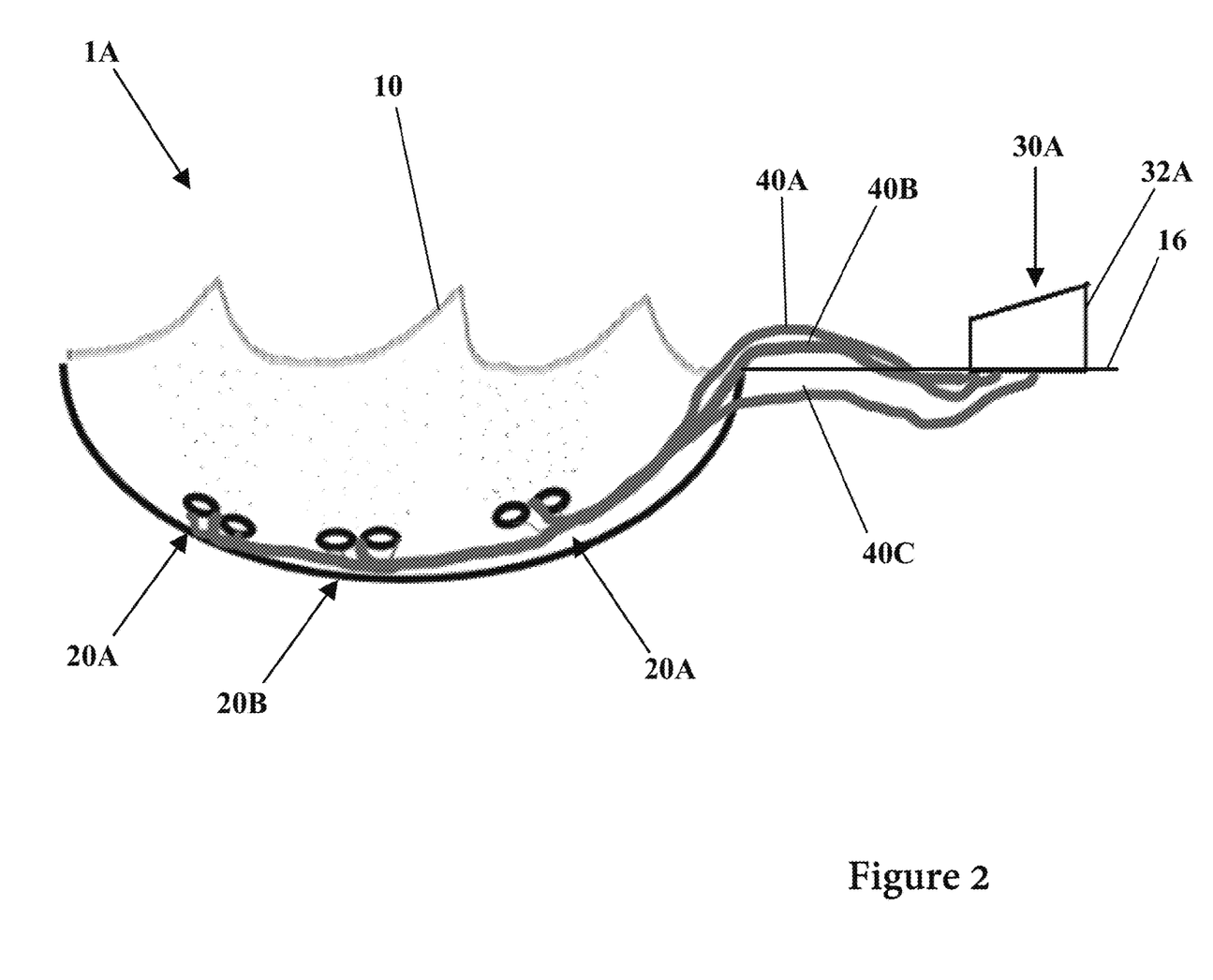
FIG. 2 is a schematic of another embodiment of a liquid aeration system including a liquid aerator in a body of liquid and an air compressor system.

FIG. 2 shows a schematic of an embodiment of a liquid aeration system 1A with multiple diffusers 20A, 20B, 20C. FIG. 2 also shows an example of an air compressor system 30A and enclosure 32A that are configured to sit on the ground 16, for example on a concrete pad (not shown) formed on the ground. In this example, the air compressor system 30A produces the compressed air for all of the diffusers 20A, 20B, 20B. The liquid aeration system 1A is illustrated as including three of the air supply lines 40A, 40B, 40C for the three diffusers 20A, 20B, 20C so that each diffuser 20A, 20B, 20C has its own respective air supply line 40A, 40B, 40C that supplies compressed air from the air compressor system 30A to the respective diffuser 20A, 20B, 20C. For example, each supply line 40A, 40B, 40C can have a similar configuration as the air supply line 40 in FIG. 1. In other embodiments, a liquid aeration system 1A may include one or more diffusers 20A, 20B, 20C and/or one or more air supply lines 40A, 40B, 40C. In another embodiment, multiple air compressor systems 30A can be provided, with each providing compressed air to a respective one of the diffusers 20A, 20B, 20C.

Figure 3:
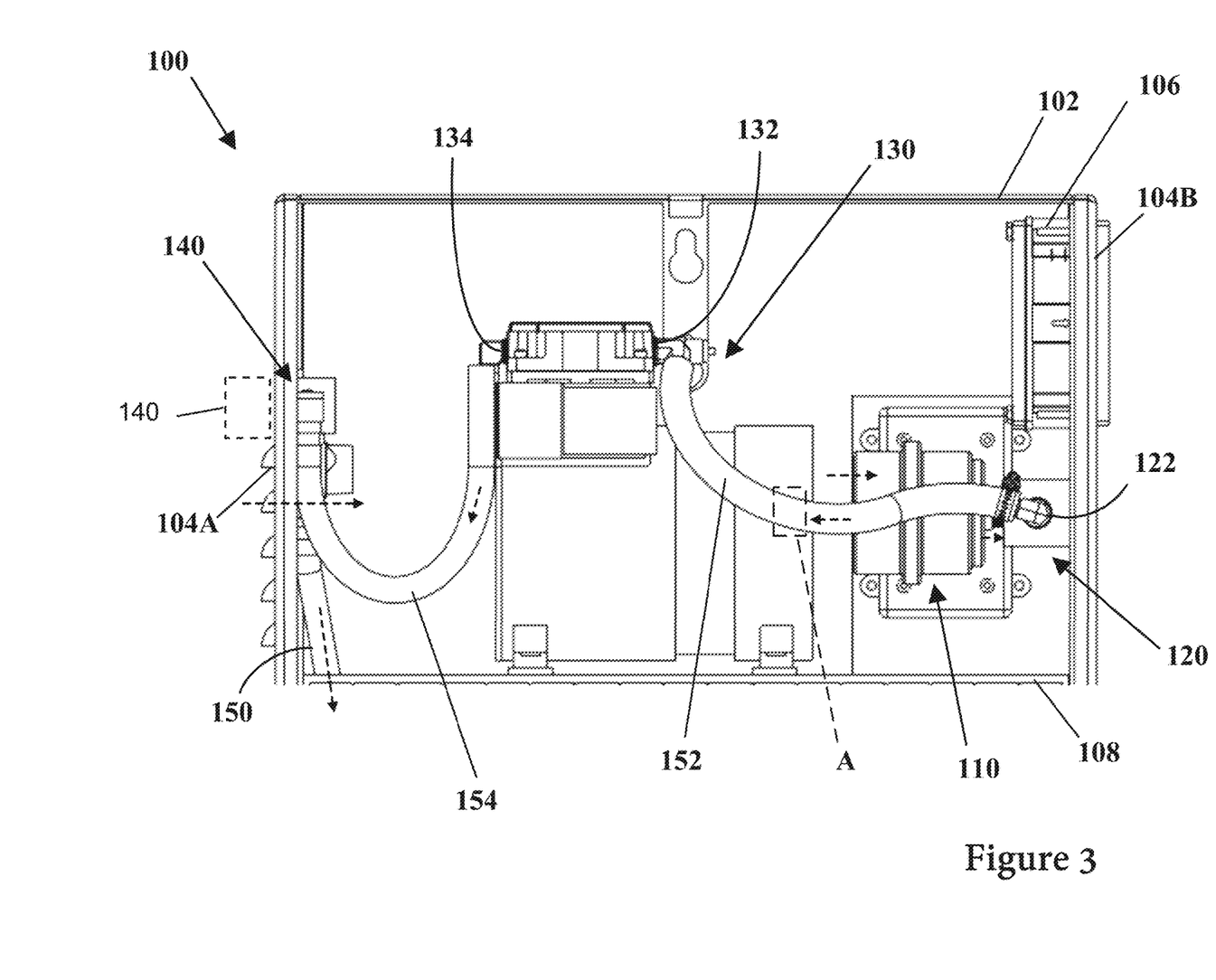
FIG. 3 is a side cross-sectional view of one embodiment of an air compressor system for a liquid aeration system.

FIG. 3 is a cross-sectional view of an embodiment of an air compressor system 100 for the liquid aeration system. For example, the air compressor system 100 may be the air compressor system 30 in FIG. 1 or the air compressor system 30A in FIG. 2. The air compressor system 100 may produce the compressed air for all of the diffuser(s) of the liquid aeration system (e.g., diffuser 20, diffuser 20A, diffuser 20B, diffuser 20C, etc.). The air compressor system 100 suctions and compresses general outdoor air from its general environment to produce the compressed air.

As shown in FIG. 3, the air compressor system 100 includes an enclosure 102, an air filter 110, an air intake manifold 120, an air compressor 130, and an outlet manifold 140. The enclosure 102 encloses and protects the components of the air compressor system 100. Air flows into the enclosure 102 through one or more openings 104A, 104B in the enclosure 102. In this example, the enclosure 102 can include a fan 106 in one of the openings 104A, 104B to increase flow of air into the enclosure 102. The air compressor system 100 in some embodiments may not include the enclosure 102. For example, the components of the air compressor system 100 may be open to the environment.

Dashed arrows are provided in FIG. 3 to show the flow of air through the air compressor system 100. In this example, air enters through the air filter 110 and then flows through the air filter 110, the intake manifold 120, the air compressor 130, and the outlet manifold 140, in this order. The air compressor 130 includes a suction inlet 132 and a discharge outlet 134. Uncompressed air (e.g., air at approximately atmospheric pressure) enters the air compressor 130 through its suction inlet 132 and compressed air is discharged from the air compressor 130 though its discharge outlet 134. The air compressor 100 is a type of compressor suitable for providing compressed air in an aeration system. For example, the air compressor 100 may be, but is not limited to, a rocking piston compressor, rotary vane compressor, or a rotary claw compressor.

The compressed air flows from the discharge outlet 134 of the air compressor 130 to the outlet manifold 140 via a compressor outlet hose 154 that fluidly connects the discharge outlet 134 of the air compressor 130 to the outlet manifold 140. The outlet manifold 140 is fluidly connected to one or more diffuser(s) of the liquid aerator. The outlet manifold 140 directs the compressed air produced by the air compressor 130 to one or more diffusers of the liquid aerator. The compressed air flows from the outlet manifold 140 of the air compressor system 100 to the diffuser(s) of the liquid aerator. The compressed air flows from the air compressor 130 to at least one diffuser of the liquid aerator via the outlet manifold 140. In an embodiment, the outlet manifold 140 may be provided external to the enclosure 102 as indicated in dashed lines in FIG. 3.

An outlet hose 150 extends from the outlet manifold 140. For example, the outlet hose 150 may connect to or be part of the air supply line for a diffuser (e.g., air supply line 40, air supply line 40A, air supply line 40B, air supply line 40C, etc.). In an embodiment, the supply line for two or more diffusers may separately connect to the outlet manifold 140. In such an embodiment, the outlet manifold 140 directs compressed air to each of the diffusers.

The air compressor system 100 may not include the outlet manifold 140 in some embodiments. In such embodiments, the outlet hose 150 can be connected directly to discharge outlet 134 of the air compressor 130 or connected to an outlet on the housing 102. The air supply line for the diffuser can be fluidly connected to the discharge outlet 134 of the air compressor 130 without an outlet manifold 140.

Air flows through the air filter 110 before entering the air compressor 130 to be compressed. The suction from the suction inlet 132 of the air compressor 130 pulls air into and through the air filter 110. The air is filtered as it passes through the air filter 110. The air filter 110 is configured to filter particulates from the air. For example, the air filter 110 filters particulates that could damage the air compressor 130, cause degradation of the air compressor 130, and/or cause internal clogging of the diffuser(s) in the liquid aeration system. In some embodiments, the air compressor system 100 may not include the air filter 110. For example, air may be suctioned through opening(s) in the air intake manifold 120 or a component (e.g., hose, pipe, etc.) connected to the air intake manifold 120.

The air flows from the air filter 110 to the air intake manifold 120 and from the air intake manifold 120 to the air compressor 130. A compressor inlet line 152 fluidly connects the intake manifold 120 and the air compressor 130. In this example, the compressor inlet line 152 extends from the suction inlet 132 of the air compressor 130 to an outlet 122 of the intake manifold 120. Air flows into the air compressor 130 by passing through the air filter 110, the intake manifold 120, and the compressor inlet line 152. The suction inlet 132 of the air compressor 130 is configured to suction filtered air intake manifold 120 through at least the compressor inlet line 152. The air passes through at least the air intake manifold 120 and the compressor inlet line 152 before entering the compressor 130

As shown in FIG. 3, the air filter 110 and the air intake manifold 120 are mounted separately from and the air compressor 130. For example, the air filter 110 and the air compressor 130 are separately mounted to a base 108 within the enclosure 102. Each of the air filter 110 and the air intake manifold 120 in FIG. 3 is not directly mounted on the air compressor 130. In part, the compressor inlet line 152 separates the suction inlet 132 of the air compressor 130 from the air filter 110 and the intake manifold 120. Air has to travel at least the length of the compressor inlet line 152 before reaching the suction inlet 132 of the air compressor 130.

The length of the compressor inlet line 152 can vary based on the particular configuration of the air compressor 130 (e.g., type, size, etc.). The compressor inlet line 152 can be, for example, at least one-inch long. In some embodiments, the compressor inlet line 152 can be, for example, at least six inches long. The compressor inlet line 152 in FIG. 3 is a hose. The compressor inlet line 152 may include, for example, a plastic and/or metal hose, a plastic pipe, a metal pipe, and the like.

The suction stream of the air compressor 130 extends from the suction inlet 132 of the air compressor 130 through the intake manifold 120 to the air filter 110. In FIG. 3, the intake manifold 120 is disposed between the air filter 110 and the suction inlet 132 of the air compressor 130. Alternatively, the air filter 110 in an embodiment may be disposed between the suction inlet 132 of the air compressor 130 and the intake manifold 120. For example, the air filter 130 may be disposed in location A shown in FIG. 3. In one embodiment, the compressor inlet line 152 may be disposed between the suction inlet 132 of the air compressor 130 and the air filter 110 in the suction stream of the air compressor 130. For example, the compressor inlet line 152 may be attached to the air filter 130 such that air flows through the intake manifold 120, the air filter 110, and the compressor inlet line 152, in that order, to reach the suction inlet 132 of the air compressor 130. In another embodiment, an air filter may be provided for the inlet opening of the enclosure 102 (e.g., opening 104A, opening 104B) and configured to filter air as it flows into the enclosure 102. For example, the air can enter the enclosure 102 by passing through an air filter.

In FIG. 3, one air filter 110 and one intake manifold 120 are provided for the single air compressor 130. In other embodiments, the air compressor system 100 may include a plurality of the air filters 110, a plurality of the intake manifolds 120, and/or a plurality of the compressor inlet lines 152 for the air compressor 130.

Figure 4:
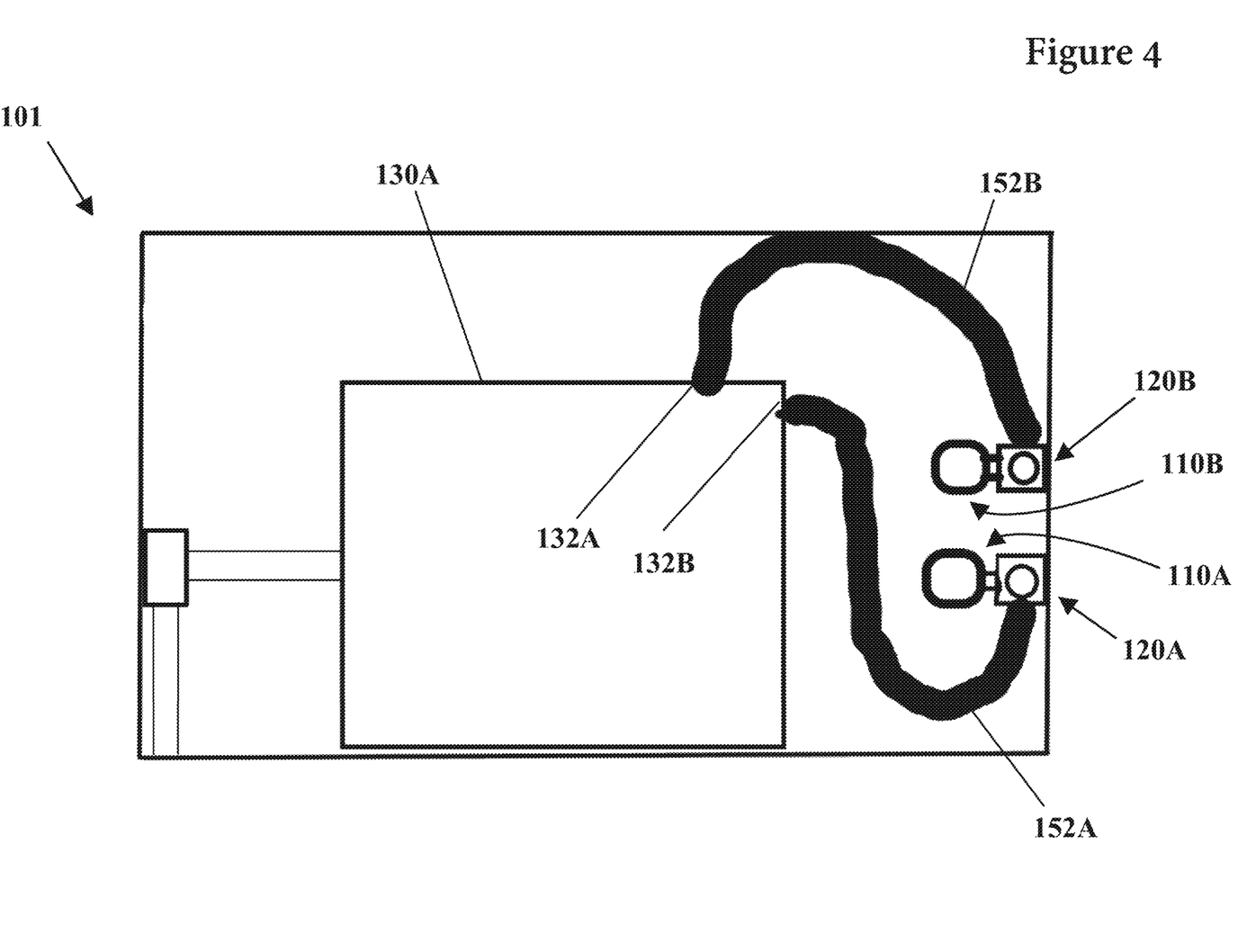
FIG. 4 is a schematic view of another embodiment of an air compressor system for a liquid aeration system.

For example, FIG. 4 is a schematic of another embodiment of the air compressor system 101 in which the air compressor 130A utilizes two of the air filters 110A, 110B, two of the intake manifolds 120A, 120B, and two of the compressor inlet lines 152A, 152B. In this example, the compressor 130A also includes two suction inlets 132A, 132B. A first air filter 110A, a first intake manifold 120B, and a first compressor inlet line 152A are connected to a first suction inlet 132A of the air compressor 130A as similarly discussed above with respect to the compressor 130 in FIG. 3. The second air filter 110B, the second intake manifold 120B, and the second compressor inlet line 152B are connected in series to the air compressor 130A similar to the air filter 110 and the intake manifold 120 in FIG. 3. A first stream of air flows through the first air filter 110A and a second stream of air (different from the air in the first stream) flows through the second air filter 110B. The air flowing into the air compressor 130A passes through at least one of the compressor inlet lines 152A, 152B before entering the air compressor 130A.

Figure 5:
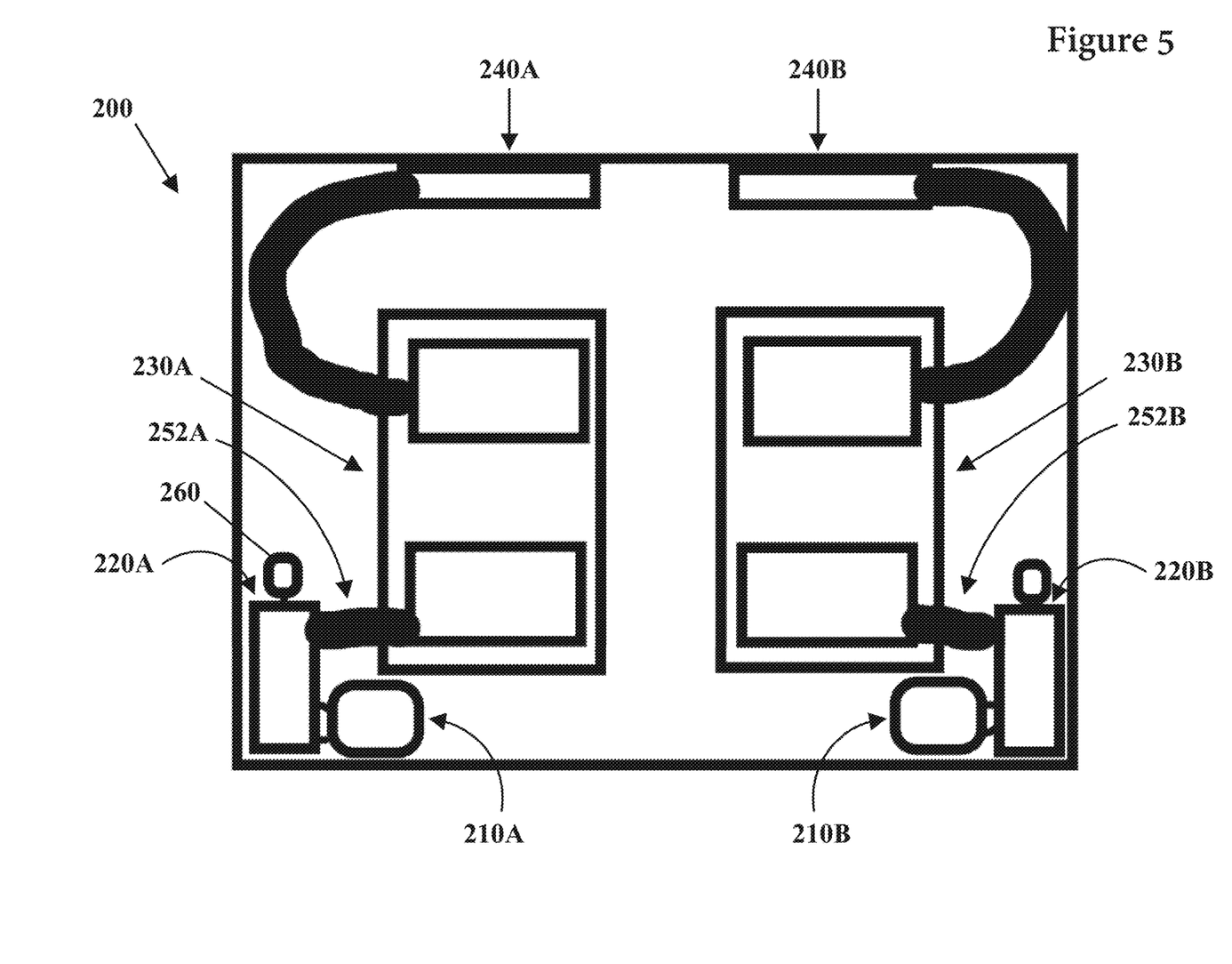
FIG. 5 is a top plan view of another embodiment of an air compressor system for a liquid aeration system.

FIG. 5 shows a top plan view of an air compressor system 200 with multiple air compressors, for example two air compressors 230A, 230B. However, it should be appreciated that the air compressor system 200 in other embodiments may include more than two air compressors 230A, 230B.

Air can flow to, through, and from each compressor 230A, 230B in a similar manner as the air compressor 130 in FIG. 3. For example, air can flow into each compressor 230A, 230B by flowing through a respective air filter 210A, 210B, a respective intake manifold 220A, 220B, and a respective compressor inlet line 252A, 252B before entering the respective air compressor 230A, 230B.

The compressed air from each air compressor 230A, 230B flows to a respective outlet manifold 240A, 240B, with the compressed air then flowing from each outlet manifold 240A, 240B to respective diffuser(s) of the aeration system. For example, the compressed air from the first air compressor 230A may flow to a first diffuser, while the compressed air from the second air compressor 230B may flow to a second diffuser. As similarly discussed above with respect to the air compressor 130 in FIG. 3, one or both of the air compressor 230A, 230B may be configured to supply compressed air to multiple diffusers of the liquid aerator.

The air compressor system 200 can include one or more sensors. For example, the air compressor system 200 can include a filter minder 260. The filter minder 260 measures a flowrate of the filtered air through the intake manifold 220A and indicates whether the air filter 210A needs to be replaced. The air compressor 200 may include other sensor(s), in alternative or in addition to, the filter minder 260. The sensors may be configured to measure one or more properties of the air flowing through the air compressor system 200 and/or operating properties of the air compressor system. For example, the air compressor system 200 may include one or more temperature sensor(s), humidity sensor(s), vacuum sensor(s), flowrate sensor(s), and/or chemical sensor(s) (e.g., oxygen concentration sensor, etc.). In some embodiments, one or more of the sensors provide an analog or a mechanical readout. In some embodiments, one or more of the sensors are digital sensors, and the air compressor system 200 is configured to transmit the digital signals to a remote electronic device (e.g., computer, smartphone, sever, etc.).

Figure 6:
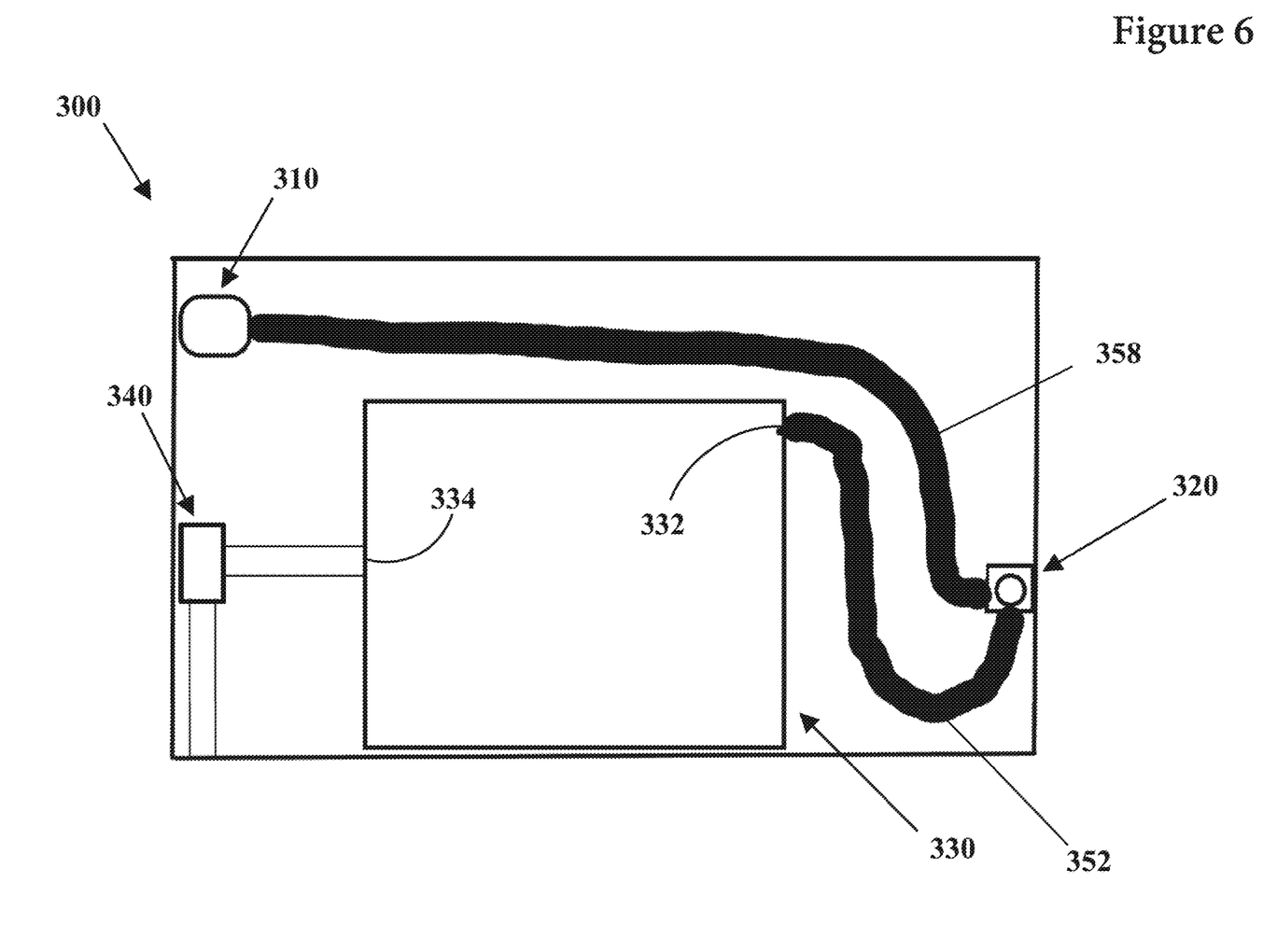
FIG. 6 is a schematic side view of another embodiment of an air compressor system for a liquid aeration system.

FIG. 6 is a schematic view of an embodiment of an air compressor system 300 for a liquid aeration system. For example, the air compressor system 300 may be the air compressor system 30 in the liquid aerator 1 of FIG. 1 or the air compressor system 30A in the liquid aerator of FIG. 2. The air compressor system 300 includes similar features to the air compressor system 100 in FIG. 3, except for the configuration of an air filter 310. For example, the air compressor system 300 includes the air filter 310, an air intake manifold 320, an air compressor 330, an outlet manifold 340, and a compressor inlet line 352. Similar to the air compressor 130 in FIG. 3, compressed air is discharged from the discharge outlet 334 of the air compressor 330 and flows through the outlet manifold 340 to one or more of diffusers of the liquid aeration system (e.g., diffuser 20, diffuser 20A, diffuser 20B, diffuser 20C).

Similar to the air compressor system 100 in FIG. 3, air from the air filter 310 flows into a suction inlet 332 of the air compressor 330 through the compressor inlet line 352. As shown in FIG. 6, a hose 358 fluidly connects the air filter 310 to the intake manifold 320. Air flow through the air filter 310 is filtered and then flows through the hose 358 to the intake manifold 320. Air is suctioned into the air compressor 330 through the air filter 310, the hose 358, the intake manifold 320, and the compressor inlet line 352, in this order. The air passes through the compressor inlet line 352 before reaching the compressor 330.

Figure 7:
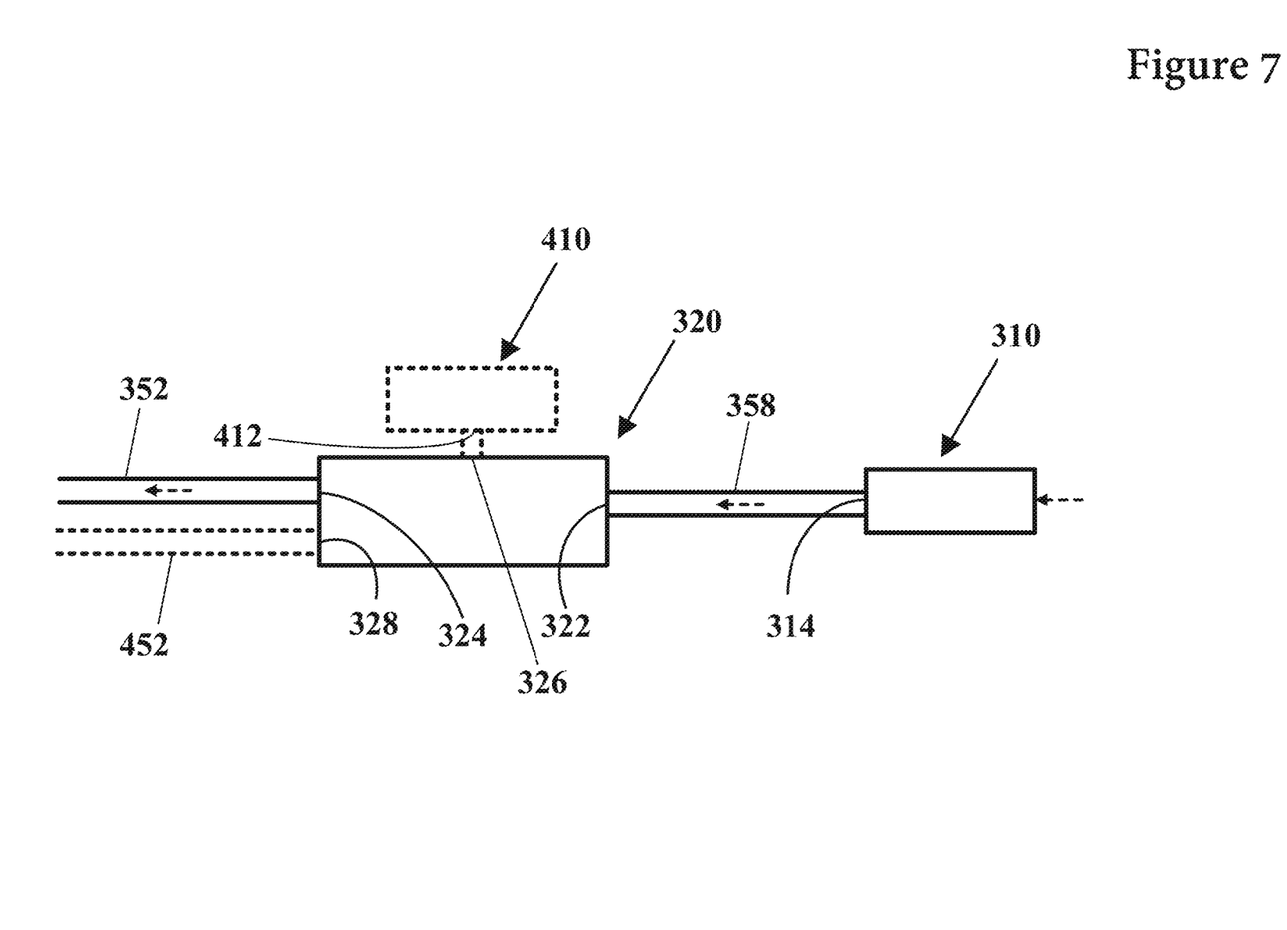
FIG. 7 is a schematic view of the intake manifold showing example locations of the air filter and the compressor inlet line.

FIG. 7 is a schematic view showing a configuration of the intake manifold 320. The intake manifold 320 can include one or more air inlets and one or more air outlets. For example, the air filter 310 can be connected to the intake manifold 320 such that filtered air exits through an outlet 314 of the air filter 310 that is connected to an inlet 322 of the intake manifold 320 by the hose 358. Alternatively, the outlet 314 of the air filter 310 may be directly connected to the inlet 322 of the intake manifold 320 without use of the hose 358 (e.g., similar to the air filter 110 in FIG. 3). In addition, the compressor inlet line 352 connects to an outlet 324 of the intake manifold 320.

In some embodiments, the intake manifold 320 may include multiple inlets. For example, the intake manifold 320 can include a second inlet 326. A second air filter 410 may be connected to the second inlet 326 of the intake manifold 410. An outlet 412 of the second air filter 410 is connected to the second inlet 326 of the intake manifold 320. The second air filter 410 may be connected to the second inlet 326 of the intake manifold 320 directly (e.g., similar to the air filter 110 in FIG. 3) or via a hose (e.g., similar to the first air filter 310 in FIG. 7).

In some embodiments, the intake manifold 320 may include multiple outlets. For example, the intake manifold 320 can include a second outlet 328. The outlets 324, 328 can provide air to multiple air compressors or to the same air compressor. A second hose 452 can be connected to the second outlet 328 of the intake manifold 320 to direct air from the second outlet 328 to a second compressor or to the same compressor as the hose 352.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A liquid aeration system for a body of liquid, comprising:
    an air compressor system including:
        an air intake manifold including an outlet,
        an air compressor including a suction inlet and a discharge outlet, the air compressor configured to compress air flowing into the suction inlet from the intake manifold into compressed air and discharge the compressed air through the discharge outlet, and
        a compressor inlet line fluidly connecting the outlet of the air intake manifold to the suction inlet of the air compressor, and the compressor inlet line having a length of at least six inches; and
    a diffuser fluidly connected to the discharge outlet of the air compressor, the diffuser dispersing the compressed air into the body of liquid.

2. The liquid aeration system of claim 1, wherein the intake manifold is mounted separately from the air compressor.

3. The liquid aeration system of claim 2, wherein the air compressor system includes an enclosure, and both of the air intake manifold and the air compressor are disposed within the enclosure.

4. The liquid aeration system of claim 3, wherein the air intake manifold is mounted on a first wall of the enclosure, and the air compressor is mounted on a second wall of the enclosure.

5. The liquid aeration system of claim 1, wherein the air compressor includes an air filter with an outlet connected to an inlet of the air intake manifold.

6. The liquid aeration system of claim 1, further comprising:
    an air supply line connecting the air compressor system to the diffuser and configured to supply the compressed air from the air compressor system to the diffuser.

7. The liquid aeration system of claim 1, wherein the body of liquid is a body of water.

8. The liquid aeration system of claim 1, wherein the air intake manifold has an inlet, the inlet and the outlet are arranged on the air intake manifold such that the air entering the air intake manifold via the inlet changes directions within the air intake manifold as the air flows from the inlet to the outlet.

9. The liquid aeration system of claim 1, wherein the compressor inlet line is a hose or a pipe.

10. An air compressor system for a liquid aeration system, comprising:
    an air intake manifold including an outlet;
    an air compressor including a suction inlet, the air compressor configured to compress air flowing into the suction inlet from the air intake manifold into compressed air; and
    a compressor inlet line fluidly connecting the outlet of the air intake manifold to the suction inlet of the air compressor, and the compressor inlet line having a length of at least six inches.

11. The air compressor system of claim 10, wherein the intake manifold is mounted separately from the air compressor.

12. The air compressor system of claim 11, further comprising:
    an enclosure, both of the air intake manifold and the air compressor being disposed within the enclosure.

13. The air compressor system of claim 10, further comprising:
    an air filter with an outlet connected to an inlet of the air intake manifold.

14. The air compressor system of claim 10, wherein the air intake manifold has an inlet, and the inlet and the outlet are arranged on the air intake manifold such that the air entering the air intake manifold via the inlet changes directions within the air intake manifold as the air flows from the inlet to the outlet.

15. The air compressor system of claim 10, wherein the compressor inlet line is a hose or a pipe.

16. A liquid aeration system for a body of liquid, comprising:
    an air compressor system including:
        an air intake manifold including an outlet,
        an air compressor including a suction inlet and a discharge outlet, the air compressor configured to compress air flowing into the suction inlet from the intake manifold into compressed air and discharge the compressed air through the discharge outlet,
        a hose fluidly connecting the outlet of the air intake manifold to the suction inlet of the air compressor, and
        an enclosure, and both of the air intake manifold and the air compressor being disposed entirely within the enclosure; and a diffuser fluidly connected to the discharge outlet of the air compressor, the diffuser dispersing the compressed air into the body of liquid.

17. The liquid aeration system of claim 16, wherein the intake manifold is mounted separately from the air compressor.

18. The liquid aeration system of claim 16, further comprising:
   an air filter with an outlet connected to an inlet of the air intake manifold.

19. The liquid aeration system of claim 16, wherein the air intake manifold has an inlet, and the inlet and the outlet are arranged on the air intake manifold such that the air entering the air intake manifold via the inlet changes directions within the air intake manifold as the air flows from the inlet to the outlet.

20. The liquid aeration system of claim 16, wherein the air intake manifold is mounted on a first wall of the enclosure, and the air compressor is mounted on a second wall of the enclosure.

\* \* \* \* \*